(12) United States Patent
Kim et al.

(10) Patent No.: US 8,108,626 B2
(45) Date of Patent: Jan. 31, 2012

(54) APPARATUS AND METHOD OF TIME KEEPING FOR NON-REAL-TIME OPERATING SYSTEM

(75) Inventors: Keun-Bok Kim, Suwon-si (KR); Kyu-Il Yeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 1076 days.

(21) Appl. No.: 11/960,184

(22) Filed: Dec. 19, 2007

(65) Prior Publication Data

US 2008/0148087 A1 Jun. 19, 2008

(30) Foreign Application Priority Data

Dec. 19, 2006 (KR) .................. 10-2006-0129866

(51) Int. Cl.
G06F 12/00 (2006.01)
G06F 13/00 (2006.01)
G06F 13/28 (2006.01)
G06F 1/00 (2006.01)

(52) U.S. Cl. ....................... 711/150; 713/500
(58) Field of Classification Search ............... None
See application file for complete search history.

(56) References Cited

U.S. PATENT DOCUMENTS 5,708,850 A * 1/1998 Staros ..................... 710/48

FOREIGN PATENT DOCUMENTS

| JP | 05020279 A | * | 1/1993 |
| KR | 1999-47698 | | 7/1999 |
| KR | 1020040059235 | | 7/2004 |

OTHER PUBLICATIONS

JPO, JPO Abstract of JP 05-020279A,1993, JPO, 2 pages.*

* cited by examiner

Primary Examiner — Kevin Ellis
Assistant Examiner — Gary W Cygiel
(74) Attorney, Agent, or Firm — The Farrell Law Firm, P.C.

(57) ABSTRACT

An apparatus and method of time keeping for a non-real-time OS is provided. The apparatus includes a processor and a Field Programmable Gate Array (FPGA). The processor requests performance of a Dual-Port Random Access Memory (DPRAM) read/write (R/W) operation in a DPRAM R/W time interval in a Time Division Multiple Access (TDMA) scheme using a system clock. Upon receipt of the DPRAM R/W operation performance request from the processor, the FPGA compares the operation performance request time with an access time table defining a DPRAM R/W time interval for each processor, generated in the TDMA scheme using the system clock. The FPGA performs the operation requested by the processor when the operation performance request has been made in the DPRAM R/W time interval of the processor.

18 Claims, 5 Drawing Sheets

APPARATUS AND METHOD OF TIME KEEPING FOR NON-REAL-TIME OPERATING SYSTEM

PRIORITY

This application claims priority under 35 U.S.C. §119 to an application filed in the Korean Intellectual Property Office on Dec. 19, 2006 and assigned Ser. No. 2006-0129866, the contents of which are incorporated herein by reference.

BACKGROUND OF THE INVENTION

1. Field of the Invention

The present invention relates generally to a non-real-time Operating System (OS), and in particular, to an apparatus and method of time keeping for accurate time scheduling in a non-real-time OS.

2. Description of the Related Art

The existing systems require a real-time OS guaranteeing a short response time. When several processors contend for the same resource, the real-time OS can prevent a collision (locking) due to the contention based on the short response time. However, in the case of an OS providing hard real-time characteristics, an increase in the system complexity causes an increase in the design cost for the OS.

A method of designing a stable system without using the real-time OS is to design a system in such a way that there is no load in the processing capacity with a sufficient margin in hardware resources. However, the sufficient hardware resource margin also causes an increase in the design cost. Therefore, the best method is to use a non-real-time OS in the system design stage and implement a hardware system in such a way that the OS and the hardware are complementary to each other.

A channel card of the existing system includes a Network Processor Unit (NPU), a Digital Signal Processor (DSP), and a Dual-Port Random Access Memory (DPRAM) supporting data communication between the NPU and the DSP. The NPU processes non-real-time packet data using a non-real-time OS. The NPU supports a Peripheral Component Interconnect (PCI) bus interface and communicates with an external processor connected through a PCI bus. On the other hand, the DPRAM does not support a PCI bus interface and thus uses a PCI Field Programmable Gate Array (FPGA) for matching between the DPRAM itself and the PCI bus of the NPU.

The DPRAM uses a Time Division Multiple Access (TDMA) scheme to prevent a collision due to the simultaneous access of the two processors. A predetermined area of the DPRAM serves as a flag area and the two processors access the flag area in a TDMA scheme, so that a write/read (W/R) operation is performed according to a flag value of the flag area. Therefore, if the two processors support a short response time, a collision due to the simultaneous DPRAM access of the two processors can be prevented. When a hard real-time OS is used for both the NPU and the DSP for an accurate TDMA scheme, the above method has no problem. However, when a non-real-time OS is used as in the currently existing system, the DPRAM access time of the NPU is not constant with a time interval defined in a DPRAM access time table but varies depending on the load of the processor (i.e., NPU), which causes data corruption in communication between the two processors (i.e., the NPU and the DSP).

The NPU based on the non-real-time OS is constructed to include two cores, i.e., a X-scale and a Micro Engine (ME). An Interrupt Service Routine (ISR) of the X-scale transmits a system clock (i.e., real time information) to the ME. The ME executes tasks using an internal timer that operates according to the real time information. However, if there is a large amount of internal load for a predetermined time period, the ME may fail to read the real time information from the X-scale while processing the internal load. In this case, errors may occur in the system clock and the internal timer of the ME. Thus, the ME, which writes data on the DPRAM through a PCI bus according to the internal timer, may fail to try the DPRAM access within the predetermined time interval of the access time table.

SUMMARY OF THE INVENTION

An object of the present invention is to solve at least the above problems and/or disadvantages and to provide at least the advantages below. Accordingly, an object of the present invention is to provide an apparatus and method of time keeping for a non-real-time OS.

Another object of the present invention is to provide an apparatus and method for reducing a time scheduling problem of a non-real-time OS.

According to one aspect of the present invention, an apparatus of time keeping for a non-real-time OS includes a processor for requesting performance of a DPRAM R/W operation in a DPRAM R/W time interval in a TDMA scheme using a system clock; and an FPGA for comparing, upon receipt of the DPRAM R/W operation performance request from the processor, the operation performance request time with an access time table defining a DPRAM R/W time interval for each processor, generated in the TDMA scheme using the system clock, and performing the operation requested by the processor when the operation performance request has been made in the DPRAM R/W time interval of the processor.

According to another aspect of the present invention, a method of time keeping for a non-real-time operating system includes requesting, from a processor to an FPGA, performance of a DPRAM R/W operation in a DPRAM R/W time interval in a TDMA scheme using a system clock; and comparing, at the FPGA, the operation performance request time with an access time table defining a DPRAM R/W time interval for each processor, generated in the TDMA scheme using the system clock, and performing the operation requested by the processor when the operation performance request has been made in the DPRAM R/W time interval of the processor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a description is given of an apparatus and method of time keeping for a non-real-time OS according to the present invention.

Figure 1:
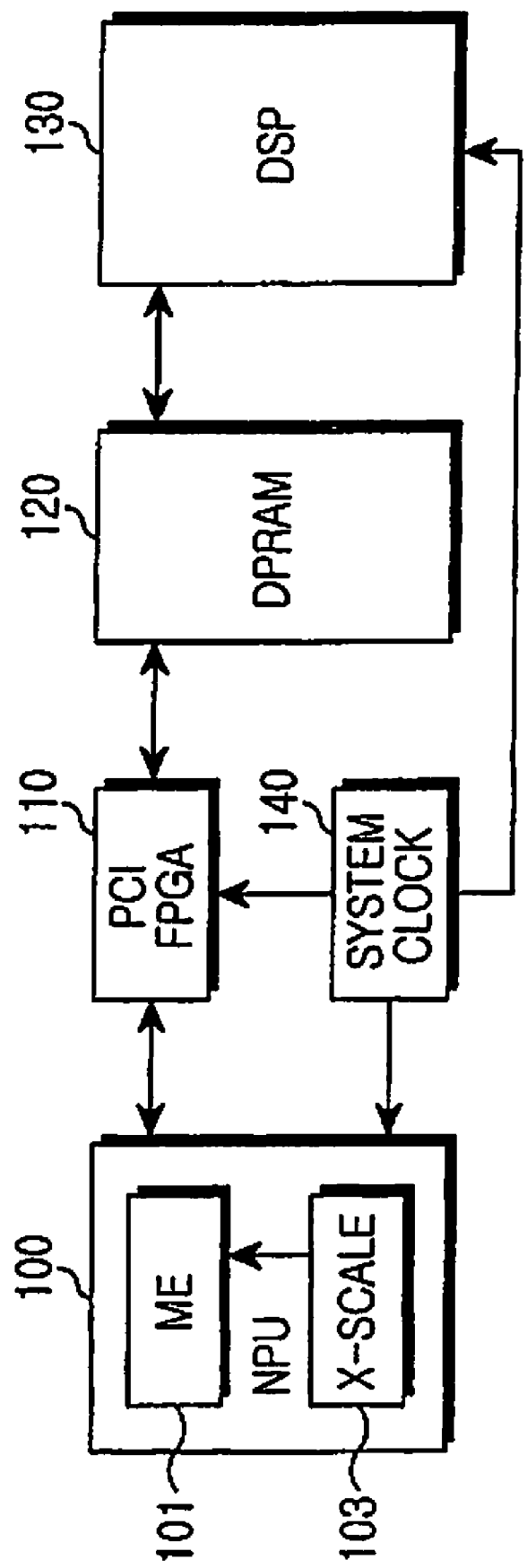
FIG. 1 is a block diagram of a time keeping apparatus for a non-real-time OS according to the present invention.

FIG. 1 is a block diagram of a time keeping apparatus for a non-real-time OS according to the present invention.

Referring to FIG. 1, the time keeping apparatus includes a Network Processor Unit (NPU) 100, a Peripheral Component Interconnect Field Programmable Gate Array (PCI FPGA) 110, a Dual-Port Random Access Memory (DPRAM) 120, a Digital Signal Processor (DSP) 130, and a system clock 140.

The NPU 100 includes a Micro Engine (ME) 101 and an X-scale 103. The X-scale 103 receives a clock from the system clock 140 and provides the clock to the ME 101. The ME 101 executes tasks using an internal timer (not shown) that operates according to the clock. The ME 101 requests the PCI FPGA 110 to perform a DPRAM read/write (R/W) operation in a Time Division Multiple Access (TDMA) scheme according to the clock. Upon receipt of an alarm interrupt signal from the PCI FPGA 110 after the request of the ME 101, the NPU 100 corrects the internal time according to the alarm interrupt signal. Upon receipt of a bus retry/wait signal, the NPU 100 delays a PCI bus access time and retries to request performance of the DPRAM R/W operation.

Upon receipt of the DPRAM R/W operation performance request from the NPU 100, the PCI FPGA 110 decodes an address of a DPRAM area for the DPRAM R/W operation. When the decoded address is a data area address of the DPRAM 120, the PCI FPGA 110 performs an R/W operation on a data area of the DPRAM 120. When the decoded address is a flag register area address of the DPRAM 120, the PCI FPGA 110 compares the arrival time of the operation performance request with an access time table. When the operation performance request occurs in an NPU R/W time interval of the access time table, the PCI FPGA 110 performs the requested operation. When the operation performance request occurs in a guard time interval of the access time table, the PCI FPGA 110 performs the requested operation and generates an alarm interrupt signal to the NPU 100. When the operation performance request occurs in a DSP R/W time interval of the access time table, the PCI FPGA 110 does not respond to the request of the NPU 100 and generates a bus retry/wait signal to the NPU 100. When there is an error in the decoded address, the PCI FPGA 110 does not respond to the request of the NPU 100. In response to the request of the NPU 100, the PCI FPGA 110 performs a read operation on a flag register area of the DPRAM 120 and transmits a real-time register value to the NPU 100.

The DPRAM 120 is divided into a flag register area and a data area. A W/R operation is performed on the data area according to a flag value of the flag register area. The DPRAM 120 uses a TDMA scheme to prevent a collision due to the simultaneous access of the two processors, i.e., the NPU 100 and the DSP 130.

The DSP 130 performs an R/W operation on the DPRAM 120 in a TDMA scheme according to a clock received from the system clock 140.

The system clock 140 provides a system clock to the NPU 100, the DSP 130 and the PCI FPGA 110, thereby enabling a time division multiple access for DPRAM matching between the NPU 100 and the DSP 130.

Figure 2:
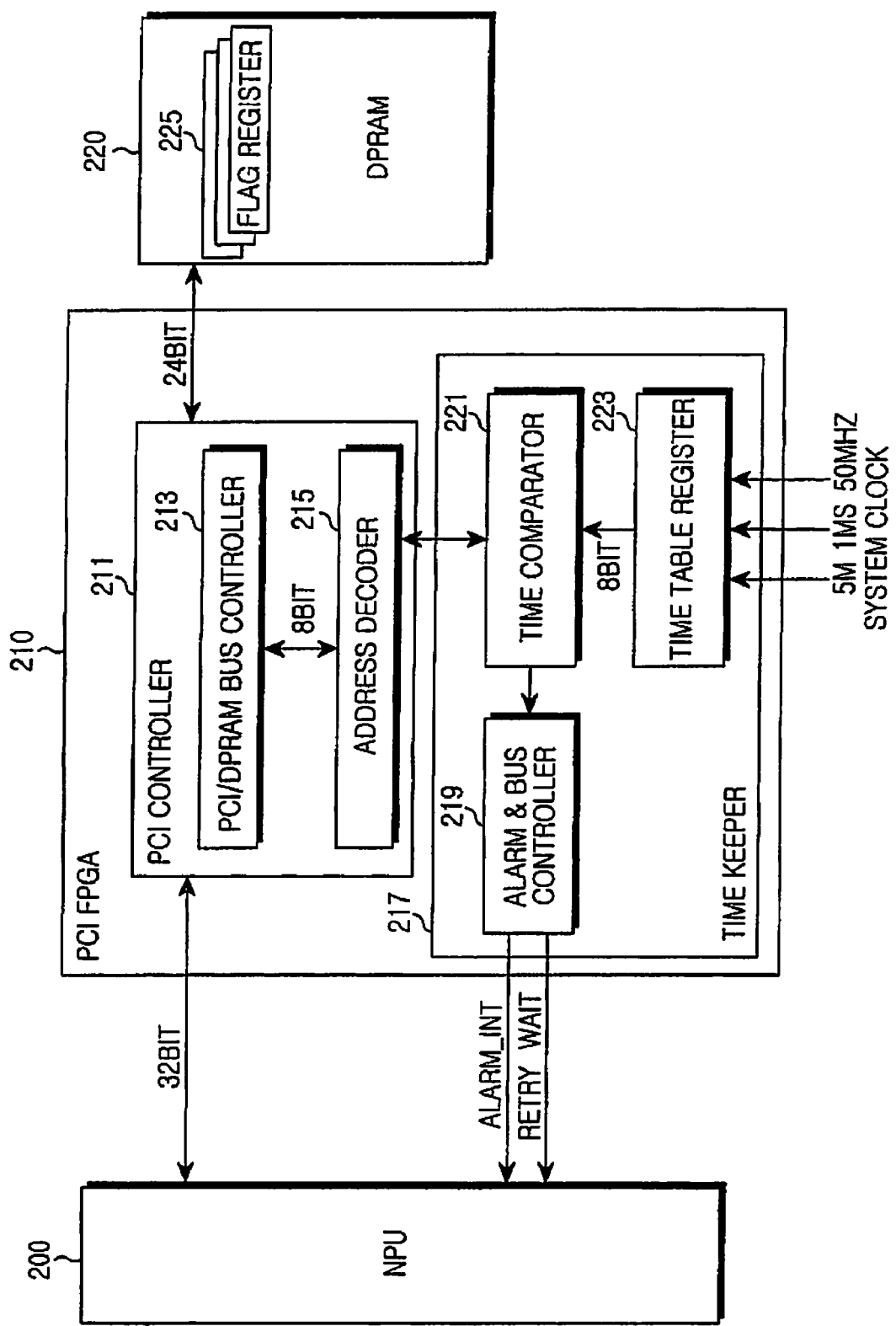
FIG. 2 is a block diagram of a PCI FPGA of a time keeping apparatus for a non-real-time OS according to the present invention.

FIG. 2 is a block diagram of a PCI FPGA of a time keeping apparatus for a non-real-time OS according to the present invention.

Referring to FIG. 2, a PCI FPGA 210 includes a PCI controller 211 and a time keeper 217. The PCI controller 211 includes a PCI/DPRAM bus controller 213 and an address decoder 215. The timer keeper 217 includes an alarm & bus controller 219, a time comparator 221, and a time table register 223.

The PCI/DPRAM bus controller 213 communicates with an external processor (e.g., an NPU 200) connected through a PCI bus. Also, the PCI/DPRAM bus controller 213 changes the PCI bus into a general bus and communicates with another external processor (e.g., a DPRAM 220) connected through a general bus.

The NPU 200 accesses a data area of the DPRAM 220 to perform an R/W operation. The NPU 200 beforehand accesses an area of a flag register 225 of the DPRAM 220 to access a data area of the DPRAM 220. At this point, the PCI controller 211 receives a DPRAM R/W operation performance request signal and an address of a desired DPRAM area (i.e., a flag register area or a data area) from the NPU 200, and outputs an 8-bit DPRAM area address to the address decoder 215. Upon receipt of a decoding result from the address decoder 215, the PCI controller 211 performs an operation requested by the NPU 200 or does not respond to the request of the NPU 200, depending on the decoding result.

The address decoder 215 decodes the input DPRAM area address. When the decoded address is an address of the data area of the DPRAM 220, the address decoder 215 outputs a decoding result indicating performance of the requested operation to the PCI/DPRAM bus controller 213. When there is an error in the decoded address, the address decoder 215 outputs a decoding result indicating the non-response to the request to the PCI/DPRAM bus controller 213. On the other hand, when the decoded address is an address of the flag register area of the DPRAM 220, the address decoder 215 outputs a DPRAM access time of the NPU 200, which is an arrival time of the DPRAM R/W operation performance request signal, to the time comparator 221. Depending on a comparison result received from the time comparator 221, the address decoder 215 outputs a decoding result indicating the performance of the requested operation to the PCI/DPRAM bus controller 213. For example, when the received comparison result indicates that there is no or little possibility of a DPRAM access time error of the NPU 200, the address decoder 215 outputs the decoding result indicating performance of the requested operation to the PCI/DPRAM bus controller 213. When the received comparison result indicates that there is a high possibility of a DPRAM access time error of the NPU 200, the address decoder 215 outputs a decoding result indicating the non-response to the request to the PCI/DPRAM bus controller 213.

The time comparator 221 compares the input DPRAM access time of the NPU 200 with an access time table of the time table register 223 to check the possibility of a DPRAM access time error of the NPU 200. The time comparator 221 outputs the comparison result to the address decoder 215, and generates a control signal to the alarm & bus controller 219, if necessary.

Figure 3:
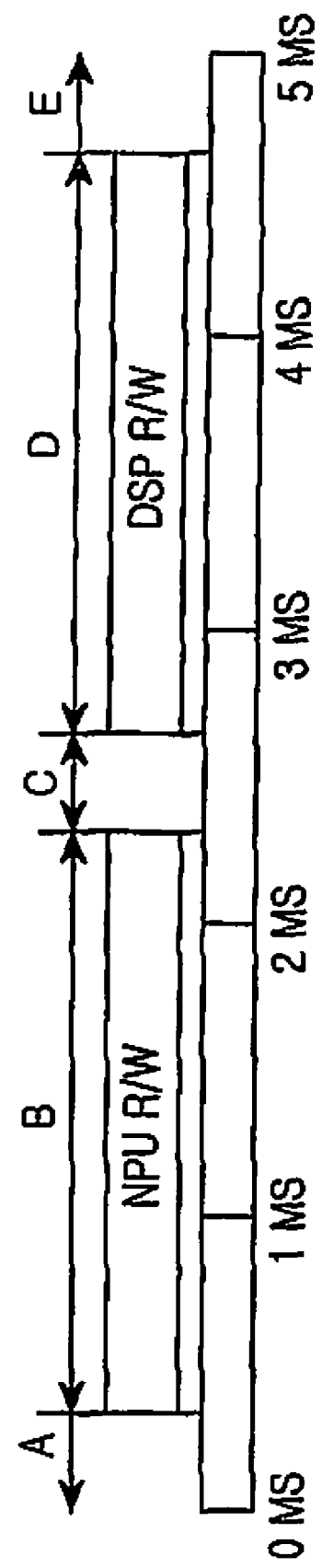
FIG. 3 is a diagram illustrating an access time table according to the present invention.

FIG. 3 is a diagram illustrating an access time table according to the present invention.

Referring to FIG. 3, in a system whose frame has a 5-ms period, an NPU R/W operation is performed during a time interval B of the 5-ms period and a DSP R/W operation is performed during a time interval D of the 5-ms period. A guard time interval C is present between the time interval B and the time interval D. Guard time intervals E and A are present between the time interval D and the time interval B. Hereinafter, the time when memory corruption occurs because an NPU R/W operation is performed during the DSP R/W time interval D will be referred to as an error time.

When the DPRAM access time is the NPU R/W time interval, the time comparator 221 determines that there is no possibility of a DPRAM access time error of the NPU 200, and outputs a comparison result indicating the determination result to the address decoder 215. When the DPRAM access time is the guard time interval, the time comparator 221 determines that there is a possibility of a DPRAM access time error of the NPU 200, outputs a comparison result indicating the determination result to the address decoder 215, and outputs a control signal indicating generation of an alarm interrupt signal, Alarm_INT, to the alarm & bus controller 219. When the DPRAM access time is the DSP R/W time interval, the time comparator 221 determines that there is a high possibility of a DPRAM access time error of the NPU 200, outputs a comparison result indicating the determination result to the address decoder 215, and outputs a control signal indicating generation of a bus retry/wait signal, Retry/Wait, to the alarm & bus controller 219.

Figure 4:
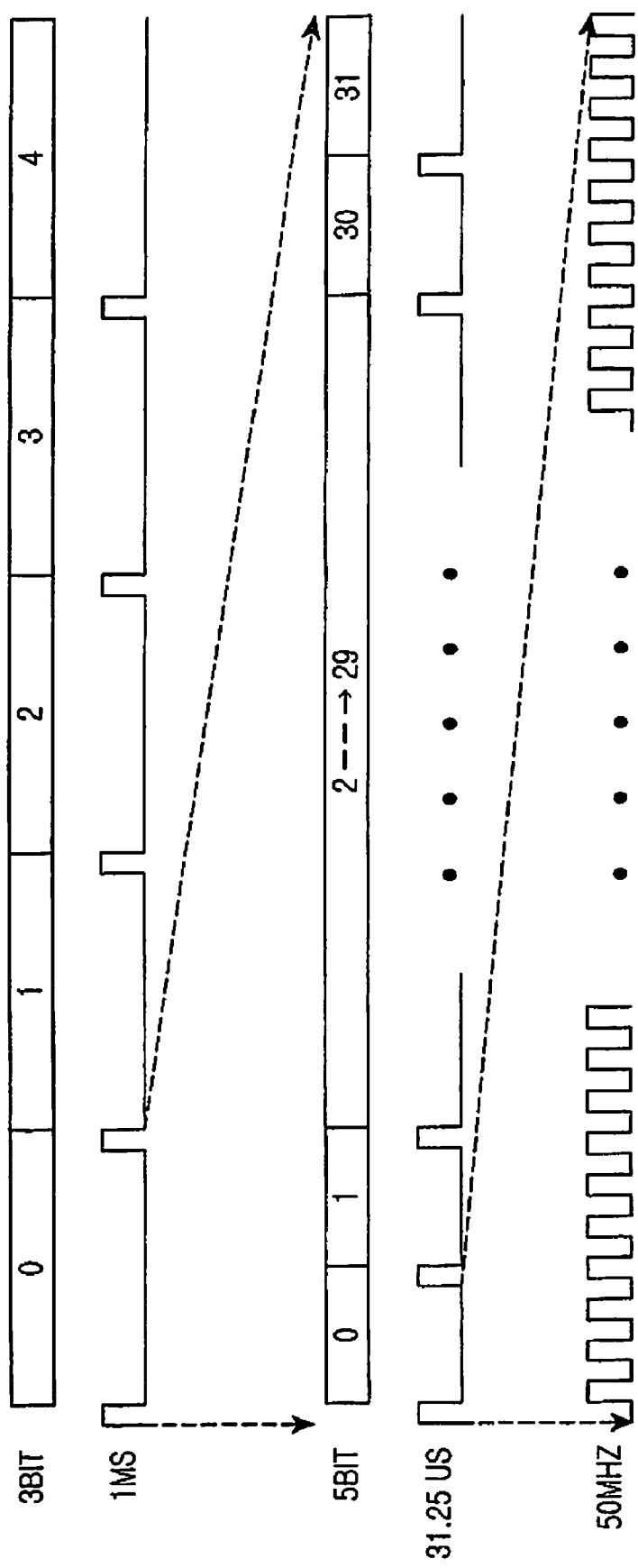
FIG. 4 is a diagram illustrating an implementation of an access time table according to the present invention.

The time table register 223 generates the 8-bit access time table in real time using an external system clock (e.g., a 5-ms, 1-ms or 50-MHz clock) received from the system clock 140. For example, in the case of a system whose frame has a 5-ms period as illustrated in FIG. 3, the access time table may be generated as illustrated in FIG. 4. A 1-ms counter is generated with the start point of a 5-ms clock line to construct a 3-bit reference time in units of ms within 5 ms, and a 31.25-µs counter is generated using a 50-MHz clock to construct a 5-bit reference time in units of µs within 5 ms. The resolution (ms, µs, or ns) of the access time table may vary depending on a system type.

The alarm & bus controller 219 generates an alarm interrupt signal, Alarm_INT, or a bus retry/wait signal, Retry/Wait, according to a control signal received from the time comparator 221, and outputs the generated signal to the NPU 200. The alarm interrupt signal is not generated at the error time, but is generated in advance to prevent the access at the error time. The use of the alarm interrupt signal prevents a bus collision that may occur in the DPRAM. The bus retry/wait signal is generated at the error time to forcibly delay the PCI bus access time, thereby preventing a bus collision that may occur in the DPRAM. When the bus retry/wait function is impossible, signals such as a hold signal, which are used in general bus protocol, may be combined to prevent the access.

Figure 5:
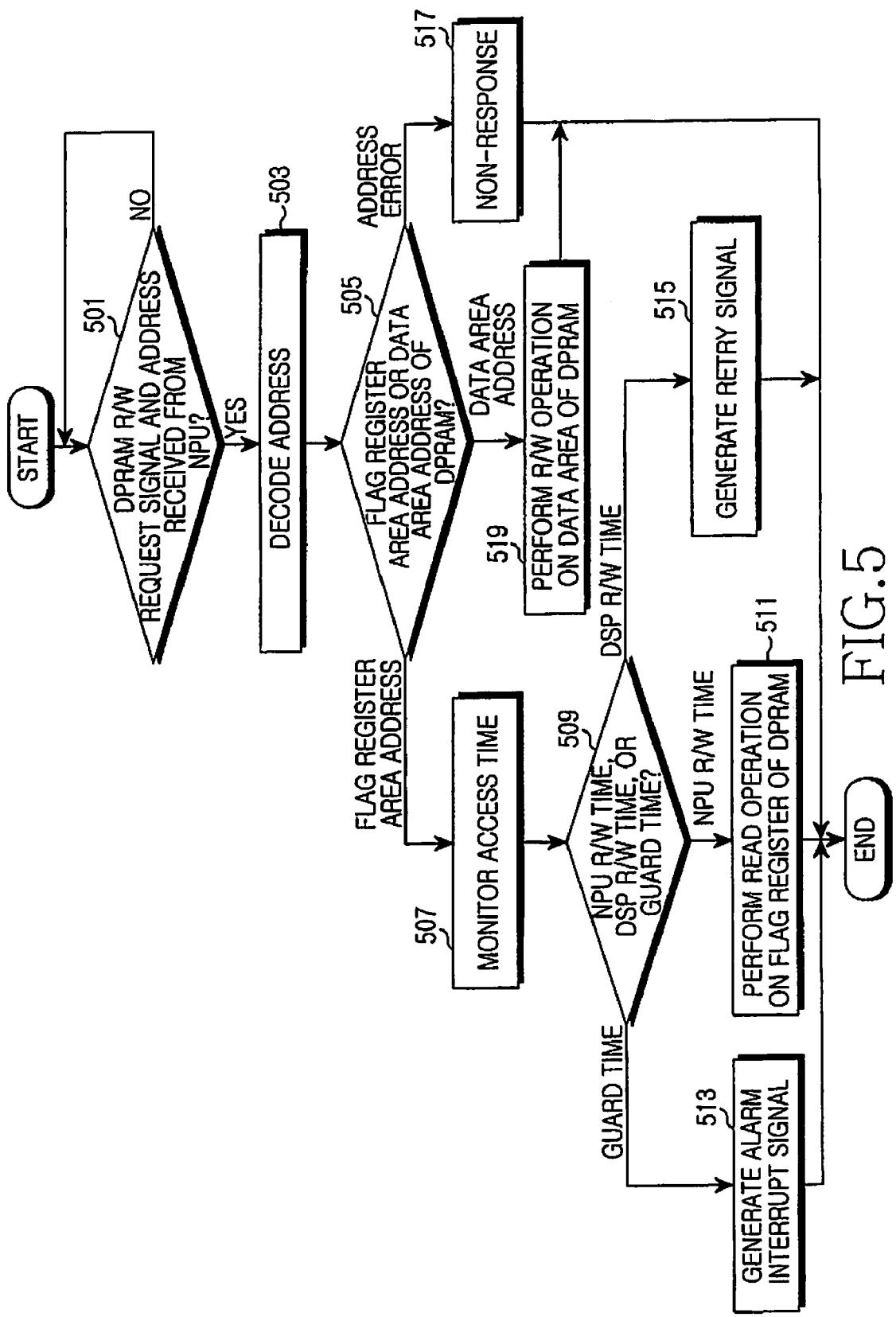
FIG. 5 is a flowchart illustrating a procedure of time keeping for a non-real-time OS according to the present invention.

FIG. 5 is a flowchart illustrating a procedure of time keeping for the non-real-time OS according to the present invention.

Referring to FIG. 5, in step 501, the PCI FPGA 110 determines if a DPRAM R/W operation performance request signal and an address of an area for the operation are received from the NPU 100. When the DPRAM R/W operation performance request signal and the address of the area are received in step 501, the PCI FPGA 110 decodes the received address in step 503.

In step 505, the PCI FPGA 110 determines if the decoded address is an address of a flag register area or a data area of the DPRAM 120. When the decoded address is a flag register area address of the DPRAM 120, the PCI FPGA 110 monitors a DPRAM access time of the NPU 100, that is an arrival time of the DPRAM R/W operation performance request signal in step 507. In step 509, the PCI FPGA 110 compares the monitored time with an access time table to determine if the arrival time of the operation performance request signal is an NPU R/W time interval, a DSP R/W time interval, or a guard time interval of the access time table.

When the arrival time of the operation performance request signal is the NPU R/W time interval in step 509, the PCI FPGA 110 performs a read operation on the flag register area of the DPRAM 120 in step 511. At this point, the PCI FPGA 110 may transmit a real-time timer register value to the NPU 100. When the arrival time of the operation performance request signal is the guard time interval in step 509, the PCI FPGA 110 generates an alarm interrupt signal to the NPU 100 in step 513. When the arrival time of the operation performance request signal is the DSP R/W time interval in step 509, the PCI FPGA 110 generates a bust retry/wait signal to the NPU 100 in step 515.

When the decoded address is a data area address of the DPRAM 120 in step 505, the PCI FPGA 110 performs an R/W operation on the data area of the DPRAM 120 in step 519. When there is an error in the decoded address in step 505, the PCI FPGA 110 does not respond to the request of the NPU 100 in step 517.

Thereafter, the PCI FPGA 110 ends the process.

In the above embodiment, when the decoded address is a data area address of the DPRAM 120, the PCI FPGA 110 directly performs an R/W operation on the data area of the DPRAM 120 without performance of another determination operation. In another embodiment, when the decoded address is a data area address of the DPRAM 120, the PCI FPGA 110 performs operations shown in steps 507 through 515 of FIG. 5.

As described above, the present invention can remove the drawbacks of the non-real time OS and the weakness of the conventional processor by providing the apparatus and method of time keeping for accurate time scheduling in the non-real-time OS. Therefore, the system design cost can be decreased and the system stability can be increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus of time keeping for a non-real-time Operating System (OS), the apparatus comprising:
   a processor for requesting performance of a Dual-Port Random Access Memory (DPRAM) read/write (R/W) operation in a DPRAM R/W time interval in a Time Division Multiple Access (TDMA) scheme using a system clock and for placing guard time intervals between the plurality of R/W time intervals, wherein the guard time intervals and the R/W time intervals do not overlap; and
   a Field Programmable Gate Array (FPGA) for comparing, upon receipt of the DPRAM R/W operation performance request from the processor, the operation performance request time with an access time table defining a DPRAM R/W time interval for the processor, generated in the TDMA scheme using the system clock, performing the operation requested by the processor when the operation performance request has been made in the DPRAM R/W time interval of the processor and performing the operation requested by the processor and generating an alarm interrupt signal to the processor when the operation performance request has been made in the guard time interval.

2. The apparatus of claim 1, wherein the access time table defines a DPRAM R/W time interval for the processor within one frame and a guard time interval between two DPRAM R/W time intervals.

3. The apparatus of claim 2, wherein when the operation performance request has been made in a DPRAM R/W time interval of another processor, the FPGA generates a bus retry/wait signal to the processor without the performance of the operation requested by the processor.

4. The apparatus of claim 1, wherein the FPGA transmits a real-time timer register value to the processor after the performance of the operation requested by the processor.

5. The apparatus of claim 1, wherein, for the DPRAM R/W operation performance request, the processor outputs a DPRAM R/W operation performance request signal and an address of a DPRAM area for the R/W operation to the FPGA.

6. The apparatus of claim 5, wherein the FPGA decodes the address, and the FPGA compares the access time table with the operation performance request time and performs the operation requested by the processor according to the comparison result when the decoded address is a flag register area address of the DPRAM.

7. The apparatus of claim 6, wherein the FPGA decodes the address, and the FPGA performs the operation requested by the processor when the decoded address is a data area address of the DPRAM.

8. The apparatus of claim 7, wherein when there is an error in the decoded address, the FPGA does not perform the operation requested by the processor.

9. The apparatus of claim 6, wherein when there is an error in the decoded address, the FPGA does not perform the operation requested by the processor.

10. A method of time keeping for a non-real-time Operating System (OS), the method comprising:
   requesting, from a processor to a Field Programmable Gate Array (FPGA), performance of a Dual-Port Random Access Memory (DPRAM) read/write (R/W) operation in a DPRAM R/W time interval in a Time Division Multiple Access (TDMA) scheme using a system clock;
   placing, by a processor, guard time intervals between the plurality of R/W time intervals, wherein the guard time intervals and the R/W time intervals do not overlap: and
   comparing, at the FPGA, the operation performance request time with an access time table defining a DPRAM R/W time interval for the processor, generated in the TDMA scheme using the system clock, performing the operation requested by the processor when the operation performance request has been made in the DPRAM R/W time interval of the processor and performing the operation requested by the processor and generating an alarm interrupt signal to the processor when the operation performance request has been made in the guard time interval.

11. The method of claim 10, wherein the access time table defines a DPRAM R/W time interval for the processor within one frame and a guard time interval between two DPRAM R/W time intervals.

12. The method of claim 11, wherein when the operation performance request has been made in a DPRAM R/W time interval of another processor, a bus retry/wait signal is generated to the processor without the performance of the operation requested by the processor.

13. The method of claim 10, further comprising transmitting a real-time timer register value to the processor after the performance of the operation requested by the processor.

14. The method of claim 10, wherein, for the DPRAM R/W operation performance request, a DPRAM R/W operation performance request signal and an address of a DPRAM area for the R/W operation are output to the FPGA.

15. The method of claim 14, wherein the address is decoded for the DPRAM R/W operation performance request, and the access time table is compared with the operation performance request time and the operation requested by the processor is performed according to the comparison result when the decoded address is a flag register area address of the DPRAM.

16. The method of claim 15, wherein the address is decoded for the DPRAM R/W operation performance request, and the operation requested by the processor is performed when the decoded address is a data area address of the DPRAM.

17. The method of claim 16, wherein when there is an error in the decoded address, the operation requested by the processor is not performed.

18. The method of claim 15, wherein when there is an error in the decoded address, the operation requested by the processor is not performed.

* * * * *